United States Patent Office 3,578,634
Patented May 11, 1971

3,578,634
THERMALLY STABLE COPOLYCARBONATE PHOSPHITE
Charles A. Bialous, Mount Vernon, and Donald B. G. Jaquiss, New Harmony, Ind., and John J. Keane, Pittsfield, Mass., assignors to General Electric Company
No Drawing. Filed Aug. 19, 1969, Ser. No. 851,454
Int. Cl. C08g *17/13*
U.S. Cl. 260—47
8 Claims

ABSTRACT OF THE DISCLOSURE

A thermally oxidatively stable copolycarbonate phosphite having an elemental phosphorus content of 0.0005 to about 1.0 weight percent based on the total weight of the polymer and to an improved process for preparing the polymer which consists of adding to the reaction of a dihydric phenol and a carbonate precursor a particular amount of a phosphorus trihalide such as phosphorus trichloride.

---

This invention is directed to a thermally oxidatively stable aromatic carbonate polymeric composition and more specifically to a copolycarbonate phosphite composition having a specific phosphorus content.

In the past, much effort has been expended on preparing thermally stable polycarbonate compositions which would be color stable at elevated temperatures and particularly at high molding temperatures necessarily employed to prepare molded polycarbonate shapes. Many additives have been successfully employed to achieve this end. Particularly, the use of organic phosphites as disclosed in U.S. Pat. 3,305,520 as an additive in admixture therewith has been found helpful in rendering polycarbonates thermally stable. In addition, other stabilizer additives have been found useful such as tetra aryl-tin compounds disclosed in Canadian Pat. 727,700. Mixtures of various materials have also been used. However, the art has been directed to additives employed in admixture with the already formed polycarbonate.

It has now been surprisingly discovered that by incorporating a particular material into the reaction synthesizing the aromatic polycarbonate, the particular material becomes a reactant and forms a copolymer, which copolymer now possesses the property of being thermally stable and suitable for processing by injection or blow molding techniques. In addition, the particular material protects the copolymer against thermal degradation while it is being synthesized.

Therefore, it is an object of this invention to provide a novel aromatic carbonate copolymeric composition.

Another object of this invention is to provide a thermally stable aromatic carbonate copolymeric composition.

These and other objects of this invention will become apparent from the following detailed description thereof.

Briefly, according to this invention, the foregoing and other objects are attained by reacting a dihydric phenol, a carbonate precursor and a phosphorus trihalide to produce a copolymeric composition having an elemental phosphorus content of 0.0005 to about 1.0 weight percent based on the total weight of the copolymeric composition.

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and mechanical agitator, charge 1100 parts of methylene chloride, 150 parts of 2,2-bis(4-hydroxyphenyl)propane, 150 parts of calcium hydroxide, 3 parts of p-tertiary butylphenol and 0.1 part triethylamine. The slurry is stirred and phosgene is added at a rate of about 90 parts per hour. After 51 minutes, the phosgene addition is terminated. The polycarbonate in solid form is recovered by filtering and evaporation of the solvent. The product is dried over night at 125° C. The product is dried over extruder which is at a temperature of about 525° F. and pelletized.

The resin is designated as A.

EXAMPLE II

To a reactor fitted with a reflux condenser and mechanical agitator, charge 1320 parts of methylene chloride, 113 parts of 2,2-bis(4-hydroxyphenyl)propane, 120 parts of calcium hydroxide, 2 parts of p-tertiary butylphenol and 0.05 part of triethylamine. The slurry is stirred and phosgene is added at a rate of about 60 parts/hour. After 40 minutes, 0.31 part of phosphorus trichloride is added while phosgenation is continued. The phosgene addition is terminated after 53 minutes. The polymer is recovered as in Example I. An elemental phosphorus content is determined by the Schoniger combustion test as described in Identification and Analysis of Plastics by Haslam and Willis, Iliffe Books, London, 1965, page 8, and is found to be 0.011 weight percent. The polymer is poly(bisphenol-A-carbonate-co-phosphite).

The polymer is designated as B.

EXAMPLE III

Example II is repeated except that 0.38 part of phosphorus trichloride is employed herein in place of 0.31 part.

Elemental phosphorus is found to be 0.020 weight percent.

The polymer is designated as C.

EXAMPLE IV

Example II is repeated except that 1.0 part of phosphorus trichloride is employed herein in place of 0.31 part.

Elemental phosphorus is found to be 0.073 weight percent.

The polymer is designated as D.

EXAMPLE V

To a reactor fitted with a reflux condenser and mechanical agitator, charge 1200 parts of methylene chloride, 150 parts of 2,2-bis(4-hydroxyphenyl)propane, 140 parts of calcium hydroxide, 3.3 parts of p-tertiary butylphenol, .018 part of triethylamine and 0.075 part of phosphorus trichloride. The slurry is stirred and phosgene is added at a rate of about 90 parts/hour. After 50 minutes, the phosgene addition is terminated. The polymer is recovered as in Example I.

Elemental phosphorus is found to be 0.0025 weight percent as determined by the test described in Example II.

The polymer is designated as E.

EXAMPLE VI

Each of the polymers of Examples I–V are molded into test samples at the temperatures so indicated in Table 1. Thermal stability to discoloration is measured in accordance with ASTM Yellowness Index Test D1925–63T. The lower the number, the lower is the discoloration of the polymer and therefore the better is the thermal stability of the polymer. Polymer A is the control and is a homopolymer of bisphenol-A only. The results are as follows:

TABLE 1

| Sample | Wt. percent phosphorus | Yellowness Index at— | |
|---|---|---|---|
| | | 650° F. | 700° F. |
| A | 0 | 4.0 | 4.7 |
| B | 0.011 | 1.8 | 1.9 |
| C | 0.020 | 2.3 | 2.3 |
| D | 0.073 | 2.4 | 2.4 |
| E | 0.0025 | 1.9 | 1.8 |

The instant invention is directed to a thermally oxidatively stable aromatic carbonate copolymeric composition having an elemental phosphorus content of 0.005 to about 1.0 weight percent based on the total weight of the copolymer. The copolymer is the reaction product of a dihydric phenol, a carbonate precursor and a phosphorus trihalide. More particularly, it is a poly-(bisphenol-A-carbonate-co-phosphite). The copolymer of this invention has excellent thermal stability wherein phosphite is reacted into the polymer chain. The resulting polymer can be used for injection or blow molding applications. The polymer of this invention is particularly useful for blow molding applications when the polymer contains higher amounts of elemental phosphorus and in particular above about 0.02 weight percent. This is attributed to the fact that the polymer exhibits non-Newtonian flow characteristics at the higher prhophorus levels as compared to the Newtonian flow characteristics exhibited by carbonate homopolymers of 2,2-bis(4-hydroxyphenyl)-propane (bisphenol-A) only or the copolymer of the invention at the lower levels of elemental phosphorus. These Newtonian flow characteristics for bispphenol-A homopolymers are exhibited over essentially all melt processing conditions. Newtonian flow is defined as the type of flow occurring in a liquid system where the rate of shear is directly proportional to the shearing force. Non-Newtonian is observed when the rate of shear is not directly proportional to the shearing force.

The phosphorus trihalide employed in the practice of this invention generally has the formula:

$$PX_3$$

wherein X is independently selected from the group consisting of bromine, chlorine, fluorine and iodine. The preferred compound to be employed in the practice of this invention is phosphorus trichloride.

The process for preparing the copolymeric composition of this invention comprises reacting a dihydric phenol with a carbonate precursor in the presence of an acid acceptor and a molecular regulator and wherein the improvement consists of adding to the reaction a phosphorus trihalide. The phosphorus trihalide added to the reaction is about 0.0008 to about 0.20 mole thereof per mole of dihydric phenol. The phosphorus trihalide may be added before the reaction between the dihydric phenol and carbonate precursor commences or it may be added after the reaction commences. It is preferable in the practice of this invention that the phosphorus trihalide be added to the reaction before the reaction between the dihydric phenol and carbonate precursor commences. The reaction conditions may be those as set forth in U.S. Pats. 3,028,365, 3,290,409 or 3,305,520, all of which are hereby incorporated herein by reference.

It is interesting to note that the amount of phosphorus trihalide and in particular phosphorus trichloride reacted into the system can be varied to produce desirable properties for particular applications while still possessing excellent thermal stability characteristics. For example, when preparing the copolymer of this invention having an increase in elemental phosphorus content, the polymer has an increase in non-Newtonian flow characteristics making it suitable for blow molding applications in addition to injection molding applications.

The dihydric phenols that can be employed herein to prepare the copolymer of this invention are bisphenols such as bis-(4-hydroxyphenyl)-methane, 2,2-bis(4-hydroxyphenyl)-propane, 2,2 - bis(4 - hydroxy - 3 - methylphenyl) - propane, 4,4 - bis(4 - hydroxyphenyl) - heptane, 2,2 - bis(4 - hydroxy 3,5 - dichlorophenyl)-propane, 2,2-bis(4 - hydroxy 3,5 - dibromophenyl) - propane, etc., dihydric phenol ethers such as bis(4 - hydroxyphenyl)-ether, bis(3,5 - dichloro - 4 - hydroxyphenyl) - ether, etc., dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5-dimethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-hydroxyphenyl)-sulfoxide, bis-(3,5-dibromo-4-hydroxyphenyl)-sulfoxide, etc. A variety of additional dihydric phenols are also available to provide carbonate polymers and are disclosed in U.S. Pats. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide, or a bishaloformate. The carbonyl halides which can be employed herein are carbonyl bromide, carbonyl chloride, carbonyl fluoride, etc., or mixtures thereof. The bishaloformates suitable for use herein include bishaloformates of dihydric phenols (bischloroformates of hydroquinone, etc.) or glycols (bishaloformates of ethylene glycol, neopentyl glycol, polyethylene glycol, etc). While other carbonate precursors will occur to those skilled in the art, carbonyl chloride, also known as phosgene, is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, paratertiarybutylphenol, para-bromophenol, etc. Preferably, para-tertiarybutylphenol is employed as the molecular weight regulator.

The poly(bisphenol-A-carbonate-co-phosphite) of this invention can be typically represented by the following repeating units:

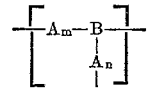

wherein A is

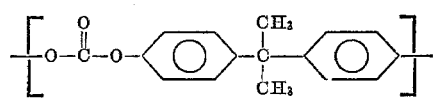

and wherein B is

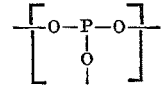

and wherein $m$ plus $n$ is about 12 to about 24,000.

It will thus be seen that the objects set forth above among those made apparent from the preceding description are efficiently attained, and since certain changes may

What is claimed is:

1. A thermally oxidatively stable copolycarbonate phosphite having an elemental phosphorus content of 0.0005 to about 1.0 weight percent based on the total weight of the copolycarbonate phosphite and having the following repeating units:

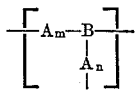

wherein A is

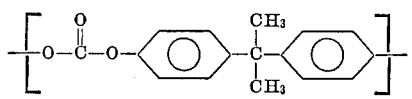

and wherein B is

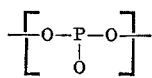

and $m$ plus $n$ is 12 to about 24,000.

2. The composition of claim 1 wherein the phosphorus content of the copolycarbonate phosphite is 0.0005–0.02 weight percent.

3. The composition of claim 1 wherein the phosphorus content of the copolycarbonate phosphite is 0.02–0.10 weight percent.

4. In a process for preparing a carbonate polymer by reacting a dihydric phenol with a carbonate precursor in the presence of an acid acceptor and a molecular weight regulator, the improvement which consists of adding to the reaction a phosphorus trihalide in an amount of about 0.0008 to about 0.20 mole per mole of dihydric phenol.

5. The process of claim 4 wherein the phosphorus trihalide is added after the reaction between the dihydric phenol and carbonate precursor has started.

6. The process of claim 4 wherein the phosphorus trihalide is added before the reaction between the dihydric phenol and carbonate precursor has started.

7. The process of claim 4 wherein the dihydric phenol is 2,2-bis(4-hydroxyphenyl)-propane and the carbonate precursor is phosgene.

8. The process of claim 4 wherein the phosphorus trihalide is phosphorus trichloride.

References Cited

UNITED STATES PATENTS 3,378,523   4/1968   Caldwell et al. _____ 260—47

SAMUEL H. BLECH, Primary Examiner

U.S. Cl. X.R.

260—49

UNITED STATES PATENT OFFICE
CERTIFICATE OF CORRECTION

Patent No. 3,578,634                    Dated May 11, 1971

Inventor(s)  C.A. Bialous, D.B.G. Jaquiss and J.J. Keane

It is certified that error appears in the above-identified patent and that said Letters Patent are hereby corrected as shown below:

Column 2, line 8 - after "is" cancel "dried over" and substitute therefor --then fed to the--;

Column 3, line 14 - "0.005" should be --0.0005--;

Column 3, line 22 - after "injection" insert --molding--;

Column 3, line 28 - "prhosphorus" should be --phosphorus--;

Column 3, line 33 - "bispphenol-A" should be --bisphenol-A--.

Signed and sealed this 11th day of January 1972.

(SEAL)
Attest:

EDWARD M. FLETCHER, JR.                ROBERT GOTTSCHALK
Attesting Officer                      Acting Commissioner of Patents